United States Patent [19]

Bengt

[11] Patent Number: 4,541,997
[45] Date of Patent: Sep. 17, 1985

[54] PROCESS OF REDUCING THE OXYGEN CONTENT IN GAS MIXTURES

[75] Inventor: Gustaf F. Bengt, Torslanda, Sweden

[73] Assignee: EKA AB, Surte, Sweden

[21] Appl. No.: 467,478

[22] PCT Filed: Jun. 28, 1982

[86] PCT No.: PCT/SE82/00228
§ 371 Date: Feb. 16, 1983
§ 102(e) Date: Feb. 16, 1983

[87] PCT Pub. No.: WO83/00139
PCT Pub. Date: Jan. 20, 1983

[30] Foreign Application Priority Data

Jul. 8, 1981 [SE] Sweden ............................ 8104242

[51] Int. Cl.$^3$ ............................................. C01B 15/02
[52] U.S. Cl. ........................................ 423/219; 423/588
[58] Field of Search ..................... 423/219, 588, 582

[56] References Cited

U.S. PATENT DOCUMENTS 4,374,820 2/1983 Guenter .................... 423/588
4,428,923 1/1984 Kunkel et al. .............. 423/588

FOREIGN PATENT DOCUMENTS 7406128 11/1974 Netherlands .
1434518 5/1976 United Kingdom .

Primary Examiner—John F. Niebling
Assistant Examiner—B. J. Boggs, Jr.
Attorney, Agent, or Firm—Luedeka & Neely

[57] ABSTRACT

A process of reducing the oxygen content in gas mixtures to 0.0–1.5% by volume, in which process the gas is contacted with a solution containing anthrahydroquinone derivatives capable of being oxidized with molecular oxygen under formation of hydrogen peroxide. The supply of oxygen is so adjusted that the amount of oxygen supplied, upon quantitative formation of hydrogen peroxide, stoichiometrically corresponds to not more than 90%, preferably 50%, of the supplied amount of anthrahydroquinone derivative. The hydrogen peroxide content at the contact surfaces between the solution and the gas must not exceed 100 millimols per liter at a simultaneous oxygen gas pressure of not more than 100 millibars. The oxygen-poor gas mixture in accordance with the process of this invention may be used as a protective or inert gas in chemical process industries where use is made of inflammable gases.

6 Claims, 1 Drawing Figure

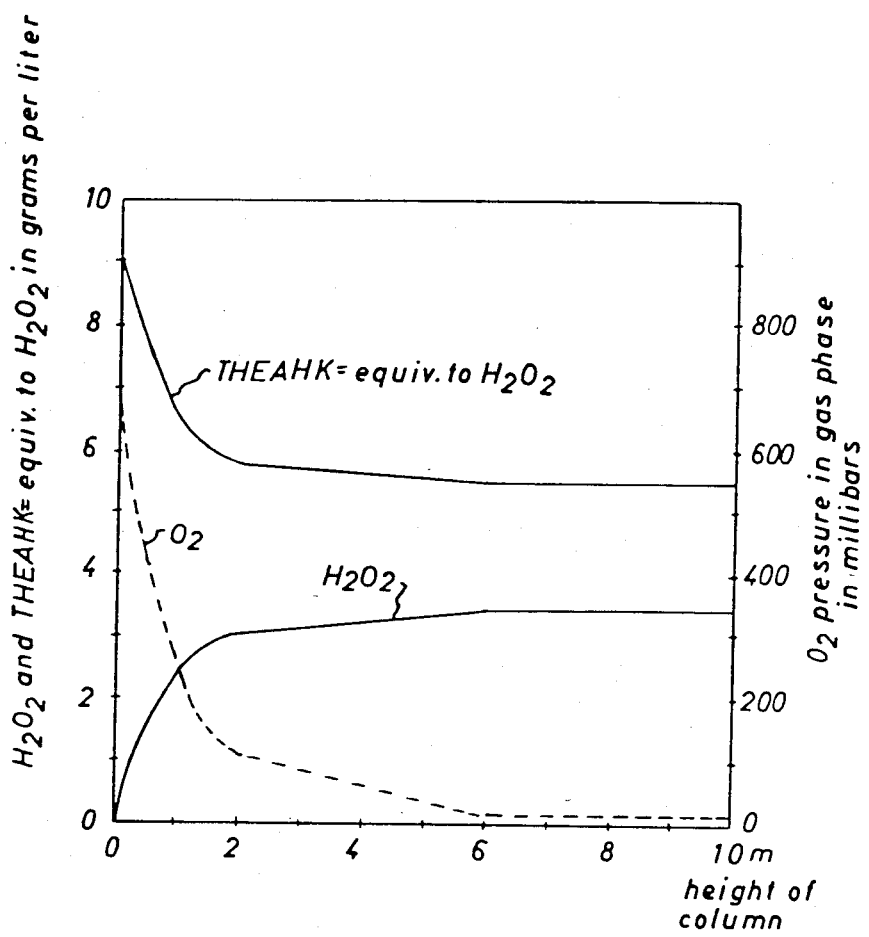

PROCESS OF REDUCING THE OXYGEN CONTENT IN GAS MIXTURES

The present invention relates to a process for reducing the oxygen content in gas mixtures that may be utilized as protective or inert gases.

In chemical process industries utilizing inflammable gases and liquids, the requirements for oxygen-poor protective or inert gases are considerable. Such is the case for instance in the preparation of hydrogen peroxide according to the so-called anthraquinone process in which anthraquinone derivatives are hydrogenated by means of hydrogen gas to anthrahydroquinone derivatives. The anthrahydroquinone derivative formed is then oxidized with molecular oxygen back to an anthraquinone derivative which forms hydrogen peroxide. One example of such reaction formulae is as follows

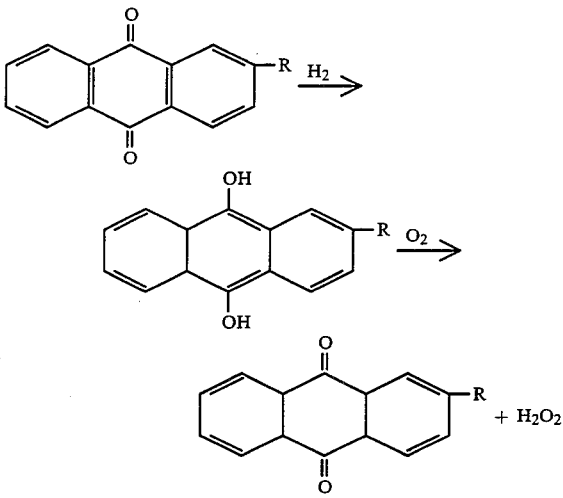

R=alkyl, for instance $C_2H_5$. An inert gas the hydrogenation step of for this process must contain not more than about 1.5% by volume of oxygen.

The inert gas requirements in the anthraquinone process have hitherto been satisfied by energy-intensive methods, for instance by closed combustion of hydrogen with air to water in a nearly stoichiometric hydrogen-oxygen ratio or by combustion of hydrocarbons with air.

In the above-mentioned anthraquinone process for the preparation of hydrogen peroxide, the oxidation of the anthrahydroquinone derivative is carried out such that the hydrogen peroxide yield, based upon the anthrahydroquinone content in the starting solution, will be as high as possible when the oxygen source is air. The oxidation therefore is carried out with excess air such that the exhaust gas will have an oxygen content of 4-10% by volume. The pressure in the oxidation reactor is usually maintained at 3-6 bars.

The exhaust gas from this oxidation process could be used as a protective gas for the hydrogenation reaction if its oxygen content could be reduced to not more than 1.0-1.5% by volume.

Surprisingly, it has been found that the oxidation cannot simply be carried out with an anthrahydroquinone-oxygen ratio to result in less than 1.5% by volume of oxygen in the exhaust gas. When the oxygen pressure is lower than 80-100 millibars, and the hydrogen peroxide content in the solution at the same time is higher than 50-100 millimols per liter, considerable amounts of water are formed, whereby the hydrogen peroxide yield and, thus, the production capacity will be reduced. Under the reaction conditions mentioned above, the reaction rate will be reduced.

On the other hand, if the hydrogen peroxide content of the solution is low, the reaction rate, relatively seen, is rather high, and at oxygen pressures below 80-100 millibars, while at the same time the water formation is also low. A controlled low content of hydrogen peroxide in the solution will enhance the possibility of performing the oxidation at a low oxygen pressure, while maintaining a high hydrogen peroxide yield. By thus maintaining the hydrogen peroxide content at a level below about 100 millimols per liter, it is possible to reduce the oxygen content of the exhaust gas to the desired level of not more than 1.5% by volume.

The present invention thus concerns a process of reducing the oxygen content in gas mixtures to 0.0-1.5% by volume, in which process the gas is contacted with a solution containing anthrahydroquinone derivatives capable of being oxidized with molecular oxygen to produce hydrogen peroxide, and which process is characterized in that the supply of oxygen is so adjusted that the amount of oxygen supplied, upon quantitative formation of hydrogen peroxide, stoichiometrically corresponds to not more than 90% of the supplied amount of anthrahydroquinone derivative, and in that the hydrogen peroxide content of the solution at the contact surfaces between the solution and the gas is not more than 100 millimols per liter at a simultaneous oxygen pressure of not more than 100 millibars. The oxygen preferably is supplied in an amount which stoichiometrically corresponds to not more than 50% of the supplied amount of anthrahydroquinone derivative.

The accompanying FIGURE shows a diagram of an oxidation process according to the invention.

The process according to the invention may preferably be carried out continuously in any type of oxidation reactor, for instance a tubular reactor or in one or more columns. If a column is used, the solution and the gas may be conducted in a co-current flow from the top to the base of the column, or vice versa. Also a counter-current flow may be employed, i.e. the gas is introduced at the base of the column and the solution at the top. In order to obtain a large contact surface between the gas and the liquid, the columns preferably are provided with built-in nettings or perforated bottoms, or filled with packings.

The oxidation temperature may amount to 20°-100° C., preferably 40°-70° C. The pressure within the oxidation reactor may be 0.8-10 bars, but preferably is limited to 1-6 bars. The solvents utilized for the anthrahydroquinone solution may be selected optionally among such solvents as are suitable for the anthraquinone process.

The process according to the invention implies a partial oxidation of the anthrahydroquinone content in the solution. Thus, this solution contains further unoxidized anthrahydroquinone derivative which may be completely oxidized in any known manner, whereupon the hydrogen peroxide can be recovered for instance by extraction with water.

The process according to the invention may be utilized to reduce the oxygen content in all types of gas mixtures, provided that they do not contain any gas capable of reacting with the solvents or the other constituents of the solution in an undesired manner.

The exhaust gas which is obtained from the oxidation system usually employed in the preparation of hydrogen peroxide by the anthraquinone process may, like air, be used for generating oxygen-poor gas mixtures according to the invention. The product gas can be purified from solvent vapours in any known manner, for instance by freezing and/or adsorption on active carbon. If a very low content of oxygen in the product gas is absolutely essential, any residual content after the process according to the invention has been carried out can be removed, for instance by catalytic combustion.

Oxygen-poor exhaust gas mixtures from the process according to the invention may thus be utilized as protective gas in, inter alia, the hydrogenation step of the anthraquinone process. After suitable purification, they may also be used as protective and inert gases within other fields of application and may constitute the starting material for the preparation of, for instance, liquid nitrogen, noble gases and ammonia.

To further illustrate the present invention, the following Examples are given which are not intended to restrict the invention.

EXAMPLE 1

200 ml of a solution containing 147 millimols of tetrahydroethylanthrahydroquinone (THEAHK) per liter were added to a 500 ml flat-bottomed glass flask. The solution as added contained no hydrogen peroxide. The gas phase within the flask consisted of air, and initially, contained 14 millimols of oxygen per liter of batched THEAHK solution. The flask was placed in a water bath, the temperature of which was maintained constant at 21° C. Disposed within the gas space was an oxygen electrode connected to a recorder which continuously indicated and recorded the oxygen content of the gas phase. As soon as the neck of the flask had been sealed gas-tight, a magnetic stirrer was started in the solution, and recording of the oxygen content in the gas was begun. After 75 minutes, the oxygen content in the gas had decreased to 0.0% by volume. The solution then contained 14 millimols of hydrogen peroxide and 133 millimols of THEAHK per liter.

EXAMPLE 2

To illustrate the importance of too high a hydrogen peroxide content in the solution, the following tests were made.

With the same equipment and at the same temperature, 200 ml of THEAHK solution were reacted with 0.300 ml of air. The solution initially contained 15 millimols of THEAHK and 111 millimols of hydrogen peroxide per liter. The oxygen content of the air was reduced during 200 minutes to 5.3% by volume. After a further 40 minutes, the oxygen content in the gas was still 5.3% by volume. The solution then contained 3 millimols of THEAHK and 117 millimols of hydrogen peroxide.

The hydrogen peroxide yield, based upon the amount of oxidized THEAHK, was 50%.

EXAMPLE 3

At the base of a cylindrical column having an internal diameter of 52 millimeters and a height of 10 meters and filled with 6 millimeters Intalox saddles of porcelain, 16.5 liters/hour of a solution containing 294 millimols of THEAHK per liter were introduced continuously. At the same time, air was introduced at the column base at a constant flow, such that the oxygen supply amounted to 102 millimols per liter of supplied THEAHK solution. Both the exhaust gas and the partially oxidized THEAHK solution left the column at the top thereof. The pressure at the column base was 3.28 bars, and 2.45 bars at the top. At a continuous steady state, when the temperature in the column was, on an average, 51.6° C., the oxygen content of the exhaust gas was 0.6% by volume. The hydrogen peroxide yield, based upon the amount of oxidized THEAHK, was 99%. The oxidation process is shown in the FIGURE.

EXAMPLE 4

11.5 liters/hour of a solution containing 270 millimols of THEAHK per liter were introduced continuously into the same column and in the same manner as in Example 3. At the same time, a gas mixture containing 5.2% by volume of oxygen and 94.8% by volume of nitrogen was introduced continuously. The gas mixture was introduced at a constant flow such that the oxygen supply was 313 millimols per liter of supplied THEAHK solution. The pressure at the column base was 1.92 bars, and 1.18 bars at the top. At a continuous steady state, the temperature in the column was, on an average, 50.8° C. and the oxygen content of the exhaust gas was 3.4% by volume.

The solution leaving the column contained 138 millimols of THEAHK and 105 millimols of hydrogen peroxide per liter. The hydrogen peroxide yield, based upon the amount of oxidized THEAHK, was 79.5%.

The embodiments of the invention in which an exclusive property or privilege is claimed are defined as follows:

1. A process of reducing the oxygen content in a gas mixture to 0.0–1.5% by volume and simultaneously producing hydrogen peroxide in high yield, comprising, contacting the gas mixture with a solution containing anthrahydroquinone derivatives capable of being oxidized with molecular oxygen to form hydrogen peroxide, the supply of oxygen being controlled such that the supplied amount of oxygen is at least 10% lower than the amount stoichimetrically corresponding to the supplied amount of anthrahydroquinone derivative on quantitive hydrogen peroxide formation, and the oxygen supply being so controlled in relation to the supply of anthrahydroquinone derivative that the oxygen pressure in the gas mixture at the surface of contact between the solution and the gas mixture is not higher than 100 millibars when the hydrogen peroxide concentration is lower than 100 millimols per liter.

2. A process as claimed in claim 1, wherein the oxygen supply is controlled so that the amount of oxygen supplied stoichimetrically corresponds to not more than 50% of the supplied amount of anthrahydroquinone derivative.

3. A process as claimed in claim 1 wherein said contacting of the gas mixture with said solution is performed at a pressure of 0.8–10 bars.

4. A process as claimed in any one of the preceding claims, wherein said contacting of the gas mixture with said solution is performed at a temperature of 20°–100° C.

5. A process as claimed in claim 1 wherein the contacting of said gas mixture with said solution is performed at 1–6 bars.

6. A process as claimed in any one of claims 1, 2 or 3 wherein the contacting of the gas mixture with said solution is performed at 40°–70° C.

* * * * *

UNITED STATES PATENT AND TRADEMARK OFFICE
CERTIFICATE OF CORRECTION

PATENT NO. : 4,541,997

DATED : September 17, 1985

INVENTOR(S) : Bengt G. Franzen

It is certified that error appears in the above-identified patent and that said Letters Patent is hereby corrected as shown below:

IN THE INVENTOR'S NAME:

Instead of "Gustaf F. Bengt", the inventor's name should read -- Bengt G. Franzen --.

IN THE ABSTRACT:

Line 2, after "volume", should appear -- is described --.

Line 5, in place of "under formation of" should appear -- to form --.

UNITED STATES PATENT AND TRADEMARK OFFICE
CERTIFICATE OF CORRECTION

PATENT NO. : 4,541,997

DATED : September 17, 1985

INVENTOR(S) : Bengt G. Franzen

It is certified that error appears in the above-identified patent and that said Letters Patent is hereby corrected as shown below:

Column 2, line 9, "while at the same time" should have been deleted.

Column 3, line 51, "0.300" should be ---.300---.

Signed and Sealed this

Third Day of December 1985

[SEAL]

Attest:

Attesting Officer

DONALD J. QUIGG

Commissioner of Patents and Trademarks